April 20, 1965   J. C. MANLEY   3,179,248
APPARATUS AND METHOD FOR SORTING RESISTORS
Filed Sept. 26, 1962   2 Sheets-Sheet 1

INVENTOR.
JOHN C. MANLEY
BY
Clarence R. Patty
ATTORNEY

# United States Patent Office 3,179,248
Patented Apr. 20, 1965

3,179,248
APPARATUS AND METHOD FOR
SORTING RESISTORS
John C. Manley, Bradford, Pa., assignor to Corning Glass
Works, Corning, N.Y., a corporation of New York
Filed Sept. 26, 1962, Ser. No. 226,264
7 Claims. (Cl. 209—81)

This invention relates to a method and means for sorting articles and more particularly to a method and means for rapid sorting of resistors based on the temperature coefficient of resistance of said resistors.

As used herein, the term temperature coefficient of resistance (TC) will mean the change in resistance from the resistance at a reference temperature, in parts per million per degree of temperature change and is shown by the equation $$TC = \frac{R_1 - R_0}{R_0} \cdot \frac{1}{T_1 - T_0} \cdot 10^6$$

where $R_1$ is the resistance at temperature $T_1$ and $R_0$ is the resistance at the reference temperature $T_0$.

In the past, it has been practical to determine the temperature coefficients of production lots of resistors on a sample basis only, due to the costly and time-consuming nature of such determinations. A typical prior art method of determining the temperature coefficient of resistance of production lots of resistors entailed taking a small sample lot and measuring the resistance thereof at some reference temperature, such as for example room temperature. The sample lot would then be placed in a temperature controlled environment and the temperature would be reduced to some value such as −15° C. After the temperature of the resistors was stabilized a resistance reading would be taken. Usually this step would be repeated for a still lower temperature such as −55° C. The resistors would then be brought to room temperature and the resistance reading would be taken. The process would then be repeated for temperatures higher than room temperature, such as for example +65° C., +105° C., and +165° C. Resistance readings would be made employing a standard Wheatstone bridge and a galvanometer. The temperature coefficients thereafter computed were taken as representative of the production lot. It is readily seen that such a procedure takes several hours to complete and is impractical for economic 100% production testing.

An object of the instant invention is to provide a means and method for rapid determination of the temperature coefficient of resistance of fixed resistors.

Another object of this invention is to provide a means and method for a 100 percent determination of the temperature coefficient of resistance of resistors as part of the production process.

A further object is to provide a means for measuring the temperature coefficient of resistance which can be readily varied to accommodate different resistance values.

A still further object is to provide a means for sorting resistors on the basis of a predetermined range of values of temperature coefficient of resistance where said predetermined range can be readily varied.

Broadly, according to the present invention the method of sorting resistors comprises providing means for sensing the rate of change of resistance, reducing the temperature of said resistors to below the lower temperature of the range through which the temperature coefficient of resistance is desired, heating said resistors at a predetermined rate, sensing the rate of change of resistance of said resistors with change in time for a predetermined interval of time, said rate of change corresponding to the temperature coefficient of resistance of said resistors, and rejecting those resistors exceeding a predetermined range of values of temperature coefficient of resistance.

According to the present invention the apparatus of sorting the resistors at a predeterminde rate, electrical means resistance comprises a means for reducing the resistor temperature to a predetermined level, means for heating the resistors at a predetermined rate, electrical means for sensing the rate of change of resistance with time, means for electrically connecting said resistors within said electrical means, means for measuring and controlling the interval of time through which said rate of change is sensed, and means responsive to said electrical means for rejecting resistors having a rate of change in excess of a predetermined range of values, said rate of change corresponding to the temperature coefficient of resistance of said resistors.

Additional objects, features and advantages of the present invention will become apparent to those skilled in the art from the following detailed description and the attached drawings on which, by way of example, only the preferred embodiments of this invention are illustrated.

FIG. 1 is a cross sectional elevation of the apparatus of this invention.

Figure 2:
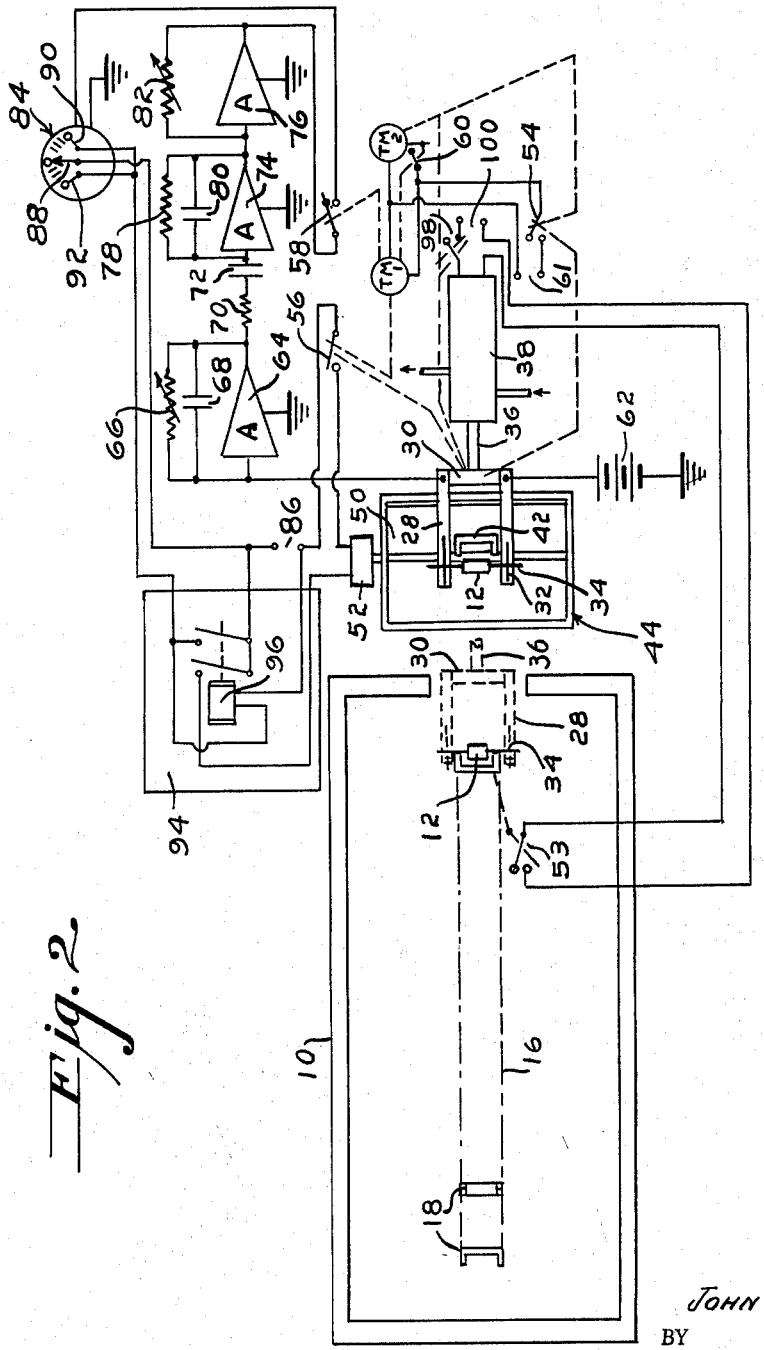
FIG. 2 is a cross sectional plan view of the apparatus of this invention including a schematic illustration of the electrical control circuits.

FIG. 1 illustrates a temperature controlled enclosure 10 formed of any suitable temperature insulating material. Resistors 12, being tested are loaded by means of a loading apparatus 14, on a conveyor assembly within said enclosure 10. The conveyor assembly comprises a power source, not shown, conveyor chain 16, resistor holders 18, and chain drive wheels 20 and 22. The speed of the conveyor is predetermined to allow resistors 12 to become temperature stabilized within enclosure 10, wherein the temperature is controlled by means of refrigeration cooling coil 24. It is readily seen that other cooling means, well known in the art, such as a Dry Ice bed and a blower, liquid carbon dioxide injection and the like may be used in place of said refrigeration coil.

As the resistors to be tested reach the end of the conveyor chain travel, they are removed from holders 18, by test clamp 26. Referring now to both FIGS. 1 and 2, test clamp 26 is shown consisting of two electrically conductive bars 28 mounted on an electrically insulating material block 30 in an electrically non-conductive manner. Spring wire clips 32 are fastened to bars 28 to form individual resistor lead clamps for each resistor lead wire 34. Test clamp 26 is mounted on shaft 36 of electrically actuated air cylinder 38. Each resistor being tested is heated at a predetermined rate by suitable means such as heater-blower 40. Heater-blower 40 is positioned so that the exhaust is directed at the resistor when it is held by clamp 26 in the test position. Ejector 42 is situated between bars 28 for removing resistors from clamp 26 after the test is completed. Tested resistors are collected in bin 44 consisting of two chambers 46 and 48. In one of these chambers rejected resistors are collected while in the other acceptable resistors are collected. Tested resistors are channeled into the proper chamber by means of flapper 50 which is operated by rotary solenoid 52.

FIG. 2 shows the test control circuit schematically and its integration with the apparatus described heretofore. As resistors are fed to the conveyor, they are positioned in holders 18. The conveyor rate of travel is regulated so that by the time a resistor reaches the end of the conveyor its temperature will stabilize at about 15° C. below the lower temperature of a desired test range. When the test resistor substantially reaches the end of the conveyor, a triggering mechanism, not shown, responsive to the position of resistor holder 18 mechanically actuates switch 53 completing the circuit of electrically actuated air cylinder 38 causing clamp 26 to be moved to the resistor pick-up position indicated by dotted lines. In this position resistor terminal leads 34 are gripped between spring clips 32 and bars 28 allowing clamp 26 to hold the test resistor and make electrical contact with each lead wire thereof. Bars 28 of clamp 26 comprise terminals of the test circuit, hereinafter described, which circuit is completed when the test resistor is held between them. Clamp 26 is then caused to retract to the test position with resistor 12 incorporated within the test circuit. In the test position the resistor is subjected to the hot exhaust of heater-blower 40, shown in FIG. 1, causing the resistor temperature to rise.

As clamp 26 is returned to the test position, switch 54, responsive to the position of clamp 26, is closed electrically by mechanical actuating means, not shown. Upon closing of switch 54 timer-motor $TM_1$ is caused to start running for a predetermined desired first interval of time. During this first interval the resistor heating rate is stabilized so that the resistor temperature rise takes place at a substantially uniform linear rate. Upon expiration of this first interval of time, timer-motor $TM_1$ causes switches 56, 58 and 60 to close electrically. At this point a second predetermined interval of time or the test interval is measured by timer-motor $TM_2$, which is actuated when switch 60 is closed electrically. Electrical energy is supplied to both timer motors $TM_1$ and $TM_2$, through terminals 61. The type of timer-motors or timing devices used is not critical as long as they are capable of measuring said predetermined intervals of time and are automatically resettable at the expiration of said periods.

Battery 62 supplies electrical energy for the resistor test. As the test resistor is being heated at a uniform rate, a current from battery 62 passes through the test resistor and is sensed by first amplifier 64. To compensate for the various values of resistance of the resistors which can be tested, variable resistor 66 is provided in conjunction with amplifier 64 for amplifier gain adjustment. Also in conjunction with amplifier 64, a negative AC feedback suppressing capacitor 68 is provided.

Resistor 70 and capacitor 72 comprise a differentiating circuit. If the resistance of test resistor 12 remains constant, the output from amplifier 64 will be constant, therefore, the signal to amplifier 74 will be zero. When the resistance of said resistor changes, the output from amplifier 64 changes accordingly causing amplifier 74 to sense a signal corresponding to the change. This signal is further amplified by amplifier 76. Amplifier 74 has a fixed gain resistor 78 and a negative AC feedback suppressing capacitor 80 associated with it. A variable gain adjustment resistor 82 is associated with amplifier 76. Resistor 82 permits adjustment of the amplifier gain corresponding to the range of acceptable temperature coefficients of resistance. The output from amplifier 76 is connected to the meter movement of meter relay 84 through switch 58. The relay portion of meter relay 84 is supplied electrical energy through terminals 86, and is controlled by switch 56.

Each test resistor is heated at a rate which may be readily determined empirically for a particular heater-blower used and a given type of test resistor. The rate will, of course, vary with the construction, mass, material and the like of the resistors. In heating the test resistor at a known rate, time corresponds to temperature, therefore, the rate of change of resistance measured corresponds to the change of resistance with a change in temperature, or the temperature coefficient of resistance. The type of heater-blower used is not critical as long as it has a heating capacity sufficient to provide the quantity of heat required by the test resistor to cause it to rise in temperature substantially linearly during the test interval. Since the resistor is heated substantially linearly, any reasonable variation in the initial temperature of the resistor, that is at the start of the test interval, will not change the result since such a variation has the effect of merely translating the heating rate curve without affecting its slope.

If the rate of change of resistance, corresponding to the temperature coefficient of resistance of the test resistor, exceeds the predetermined limits, as set by gain adjustment resistor 82, the meter relay pointer 88 makes contact with upper limit relay contact 90 or lower limit relay contact 92, depending on the direction of the excess rate of resistance change, causing the rotary solenoid 52 circuit to be electrically completed. When the rotary solenoid is energized, hinged flapper 50 is caused to move to a reject position, such as is indicated by dotted lines in FIG. 1. Hold circuit 94 is incorporated within the rotary solenoid circuit so that once the solenoid is energized it remains energized while one resistor is being tested and rejected. Such a hold circuit may comprise a double pole single throw relay 96 which is energized when the solenoid circuit is completed by meter relay 84, and remains energized by having one set of its own contacts electrically connected in a self-holding manner. Such circuits are well known in the art. The hold circuit is used herein to reject a resistor at the end of the test when the tested resistor has a temperature coefficient of resistance outside of the predetermined limits at any test temperature.

At the completion of the test interval, that is after the resistor has been heated through a predetermined desired temperature range and the rate of change of resistance has been sensed through such a range, timer-motor $TM_2$ runs out causing switch 54 to open electrically, automatically resetting both timers for the next test, and causing switch 98 to close electrically. The next resistor to be tested has, during the previous test, been moved by the conveyor substantially to the end thereof for pick-up by clamp 26. The triggering mechanism associated with its resistor holder 18, mechanically actuates switch 53 energizing the cylinder 38 electrical circuit. Electrical energy is supplied to the air cylinder electrical actuating means through terminals 100. With switches 98 and 53 being electrically closed indicating that the previous test is completed and the next resistor is ready to be picked-up, air cylinder 38 causes clamp 26 to retract briefly causing the tested resistor 12 to be removed from clamp 26 by means of ejector 42. The resistor then drops into either chamber 46 or 48 depending on the position of flapper 50 which corresponds to whether the resistor is being rejected or not. Air cylinder 38 then causes clamp 26 to move forward to the resistor pick-up position to clamp onto the next resistor to be tested. As clamp 26 is retracted to the test position, mechanical triggering means, not shown, which means are responsive to the position of clamp 26, de-energize the rotary solenoid by electrically opening switch 56, causing flapper 50 and solenoid 52 to return to the de-energized or normal position, electrically open switch 98, and electrically close switch 54 energizing timer-motor $TM_1$ to start the testing cycle of said next resistor.

The position of clamp 26 is controlled by air cylinder 38. Said cylinder is controlled by mechanically triggered electrical actuating means which regulate the amount of air that is supplied to the cylinder. Such actuating means are incorporated within said cylinder. By regulating the air supplied to the cylinder clamp 26 is caused to move to the resistor pick-up position, retract to the test position and retract further to eject the tested resistor from clamp 26. Mechanical triggering means for energizing and de-energizing electrical switches are well known in the art, therefore, such means are not shown and do not form a part of this invention. Air cylinders embodying electrical actuating means are also well known in the art and a suitable cylinder can be readily selected by one familiar with the art.

A typical example of carrying out the present invention is illustrated by the following. An apparatus such as illustrated in FIGS. 1 and 2 is provided. The temperature within enclosure 10 is reduced to about −70° C., by the cooling means. Encapsulated metallic oxide film resistors are loaded onto resistor holders 18 mounted on the conveyor assembly within enclosure 10 by means of a suitable loading apparatus. The conveyor speed is adjusted so that the resistors being conveyed would reach a temperature of about −70° C. while being conveyed through the enclosure, and would advance a distance substantially equivalent to the distance between resistor holders in the interval of time required to maintain one such resistor on test. The time required for heater-blower 40 to raise the temperature of a test resistor from about −55° C. to about +165° C. was determined empirically to be about 6 seconds.

Test clamp 26 is caused to move to the resistor pick-up position by electrically operated air cylinder 38. The air cylinder is actuated by electrically closing switch 53 by a triggering mechanism responsive to the position of the resistor holder which holds the next resistor to be tested. The triggering mechanisms are so positioned in respect to switch 53 that the test clamp will be moved forward to pick up a test resistor each time a resistor will be in the proper position to be picked up. Having clamped onto the resistor leads, the test clamp returns to the test position which places the test resistor in the path of the hot exhaust from the heater-blower. As the test clamp is returned to the test position, switch 54 is closed electrically causing timer-motor $TM_1$ to measure a first interval of time. During the first interval of time, lasting about 0.6 second, the heating rate of the test resistor is stabilized and its temperature is raised from about −70° C. to about −55° C. As this first interval of time runs out, timer-motor $TM_1$ causes switches 56, 58, and 60 to close electrically, thereby beginning the test interval. Closing switch 60 causes timer-motor $TM_2$ to measure the testing time. Switch 58 completes the meter movement circuit of meter relay 84, while switch 56 completes the relay circuit of meter relay 84. It should be noted that the test resistor is heated continuously and time is measured continuously. Timer-motor $TM_2$ measures time from the point when timer-motor $TM_1$ runs out.

As the test resistor is heated from about −55° C. to +165° C. a current from battery 62 is passed through it. Amplifier 64 having its gain suitably adjusted by resistor 66 to accommodate the resistance value of the test resistor, senses the current from the battery. Amplfier 64 is coupled to amplifier 74 by means of a differentiating circuit comprising resistor 70 and capacitor 72. As long as the resistance of the test resistor remains unchanged no signal will be transmitted by amplifier 64 to amplifier 74, due to the differentiating circuit coupling the two amplifiers. If the resistance of the test resistor changes, the corresponding signal changes will be sensed by amplifiers 74 and 76.

Amplifier 76 is adjusted by means of gain adjustment resistor 82 so that a signal sensed and transmitted by it corresponding to an excessive temperature coefficient of resistance will cause the meter relay pointer to make electrical contact with either the upper or lower limit relay contacts 90 or 92. When such contact is made the rotary solenoid circuit is completed electrically, causing flapper 50 to move into a position such that the resistor will thereafter drop into the reject compartment of bin 44.

After the test is completed clamp 26 is retracted slightly causing ejector 40 to remove the test resistor from the clamp and allow it to drop into bin 44.

Although the present invention has been described with respect to specific details of certain embodiments thereof, it is not intended that such details be limitations upon the scope of the invention except insofar as set forth in the following claims.

What is claimed is:

1. A method for sorting resistors comprising the steps of reducing the temperature of said resistors to a predetermined first temperature, heating said resistors individually for a first predetermined interval of time to a second temperature thereby stabilizing the heating rate of said resistors, heating said resistors individually at a predetermined rate for a second predetermined interval of time to a third temperature while sensing the rate of change of resistance thereof with change in time, said rate of change corresponding to the temperature coefficient of resistance of said resistors, and rejecting those resistors exceeding a predetermined range of values of temperature coefficient of resistance.

2. A method for sorting resistors exceeding a predetermined range of values of temperature coefficient of resistance comprising reducing the temperature of said resistors to a first temperature of about 15° F. below the lower temperature of the range through which the temperature coefficient of resistance is desired, heating said resistors individually for a first predetermined interval of time to a second temperature thereby stabilizing the heating rate of said resistors, heating said resistors individually at a predetermined rate for a second predetermined interval of time to a third temperature while sensing the rate of change of resistance thereof with change in time, said rate of change corresponding to the temperature coefficient of resistance of said resistors, and rejecting those resistors exceeding a predetermined range of values of temperature coefficient of resistance.

3. An apparatus for sorting resistors comprising means for heating resistors individually at a predetermined rate for a predetermined interval of time, means for measuring the rate of change of resistance with change in time while each resistor is being heated, and means for rejecting those of said resistors having said rate of change exceeding a predetermined range of values.

4. An apparatus for sorting resistors comprising in combination means for cooling resistors to a predetermined temperature, means for heating said resistors individually at a predetermined rate, circuit means for sensing the rate of change of resistance with change in time while each of said resistors is being heated, means for electrically connecting said resistors individually within said circuit means, means for controlling the interval of time through which said rate of change is sensed, and means responsive to said circuit means for rejecting those of said resistors having said rate of change exceeding a predetermined range of values.

5. An apparatus for sorting resistors comprising in combination means for cooling resistors to a predetermined temperature, means for heating said resistors individually at a predetermined rate, circuit means for sensing the rate of change of resistance with change in time while each of said resistors is being heated, means within said circuit means for adjusting signal gain in accordance with the resistance of the resistors being sorted, means within said circuit means for adjusting signal gain in accordance with predetermined limits of temperature coefficient of resistance, means for electrically connecting said each of said resistors individually within said circuit means, means for controlling the interval of time through which said rate of change is sensed, and means responsive to said circuit means for rejecting those of said resistors having said rate of change exceeding a predetermined range of values, said rate of change corresponding to the temperature coefficient of resistance of said resistors.

6. The apparatus of claim 5 wherein said means for electrically connecting said resistors is a clamp comprising a block of dielectric material, two electrically conductive members mounted on said block in an electrically non-conductive manner, and clips mounted at one end of each of said members, said members being terminals of said circuit means.

7. In an apparatus for sorting resistors on the basis of the temperature coefficient of resistance thereof; means for cooling resistors to a predetermined temperature;

means for heating said resistors individually at a predetermined rate; circuit means for sensing the rate of change of resistance with change in time while each of said resistors is being heated; said circuit means embodying terminal means for engaging a resistor, a signal current source coupled to one of said terminals, first amplifier means coupled to the other of said terminals, means associated with said first amplifier means for adjusting signal gain in accordance with the resistance of the resistors being sorted, second amplifier means, means associated with said second amplifier means for adjusting signal gain in accordance with predetermined limits of temperature coefficient of resistance, a differentiating circuit coupling said first and second amplifier means, and a meter relay responsive to said second amplifier means; means embodying said terminals for electrically connecting said resistors individually within said circuit means; first timing means responsive to the last mentioned means for measuring a first resistor heating rate stabilization interval of time; second timing means responsive to said first timing means for measuring a second interval of time through which said rate of change is sensed; and means responsive to said meter relay for rejecting those of said resistors having a rate of change exceeding a predetermined range of values; said rate of change corresponding to the temperature coefficient of resistance of said resistors.

References Cited by the Examiner
UNITED STATES PATENTS

| | | | |
|---|---|---|---|
| 2,754,472 | 7/56 | Polye | 73—362 X |
| 2,960,866 | 11/60 | Pharo | 73—362 X |
| 2,978,102 | 4/61 | Morris | 209—81 |
| 3,038,106 | 6/62 | Cutsogeorge | 324—62 |

SAMUEL F. COLEMAN, *Acting Primary Examiner.*
ROBERT B. REEVES, WILLIAM B. LA BORDE,
*Examiners.*